J. H. ORMSBY.
Thill Coupling
No. 107,404.     Patented Sept. 13, 1870.
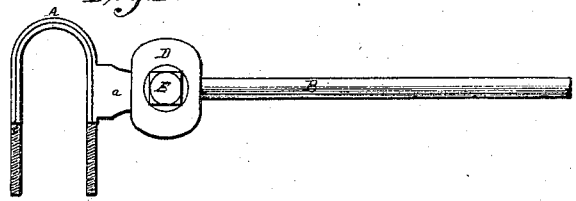
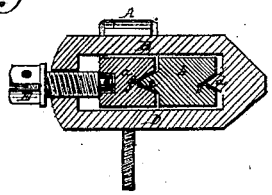

United States Patent Office.

JUSTIN H. ORMSBY, OF DIXON, ILLINOIS.

Letters Patent No. 107,404, dated September 13, 1870.

IMPROVEMENT IN THILL-COUPLINGS.

The Schedule referred to in these Letters Patent and making part of the same

I, JUSTIN H. ORMSBY, of Dixon, in the county of Lee and State of Illinois, have invented certain Improvements in Thill-Couplings, of which the following is a specification.

The object of my invention is to provide a thill-coupling for general use, which shall be strong and durable, and which shall have its parts so constructed, arranged, and joined together, that it cannot become loose by wear, whereby the disagreeable rattling of ordinary thill-couplings is effectually prevented, as will be more fully hereafter set forth.

In the accompanying drawing—

Figure 1 represents a side view of my invention.

Figure 2 represents a vertical section from front to rear of fig. 1, on the line $x\,x$.

General Description.

A is an ordinary axle-clip, from which extends an arm, $a$.

B is a shank-iron, upon which is formed the head $b$; this head is provided upon one side with a conical projection or pivot, $e$, and upon the opposite side with a conical depression, $g$.

The arm $a$ is made, also, with a conical depression, $f$, corresponding to and fitting the projection $e$.

Upon the opposite side of the said arm $a$ is a depression, $c$, to receive the set-screw E.

D is a clamp for securing and holding the parts firmly together. This clamp is made in form similar to a hollow parallelogram, and is furnished at one of its ends with the conical projection $d$, and at the other end is perforated to admit the set-screw E.

The head $b$ of the shank B is placed against the side of the arm $a$, so that the conical projection upon the said shank-head shall fit into the conical depression upon the said arm. The clamp D is then passed over the above parts until the conical projection $d$ thereof fits into the conical depression of the shank-head $b$. The set-screw E is then tightened until the point thereof enters the depression $e$ of the arm $a$, when the whole constitutes a strong and durable coupling.

It will be seen that as the sides of the arm $a$, shank-head $b$, and clamp D wear away, it will only be necessary to give an additional turn to the set-screw E to cause the coupling to be as tight and complete as ever.

The conical pivoting of the joints renders it impossible that any wear shall destroy the joint, so that it will rattle.

I make the arm $a$ ordinarily large enough so that there can be no motion between it and the clamp D; the object of this is to prevent the set-screw E from working loose.

I do not claim to be the inventor of conical pivots to prevent loosening from wear, as I am well aware they have been extensively used in harvester pitmans.

What I do claim as new, and desire to secure by Letters Patent, is—

The thill-coupling above described, consisting of the arm $a$, shank-head $b$, and clamp D, provided with a set-screw, E, when all are constructed and arranged as specified and shown, and for the purpose set forth.

J. H. ORMSBY.

Witnesses:
J. W. MUNDAY,
J. L. COBURN.